(12) United States Patent
Ohm et al.

(10) Patent No.: US 11,177,491 B2
(45) Date of Patent: Nov. 16, 2021

(54) CELL-MONITORING CONNECTOR AND FUEL CELL HAVING STRUCTURE FOR DETACHABLY MOUNTING THE CELL-MONITORING CONNECTOR THEREON

(71) Applicants: HYUNDAI MOTOR COMPANY, Seoul (KR); KIA MOTORS CORPORATION, Seoul (KR); MOLEX, LLC, Lisle, IL (US); Yura Corporation Co., Ltd., Seongnam-si (KR)

(72) Inventors: Ki Wook Ohm, Yongin-si (KR); Kwi Seong Jeong, Yongin-si (KR); Duck Whan Kim, Seongnam-si (KR); Suk Min Baeck, Seongnam-si (KR); Ju Han Kim, Yongin-si (KR); Seung Jun Yeon, Yongin-si (KR); Young Bum Kum, Seoul (KR); Yong Suk Heo, Seoul (KR); Ho Sung Lee, Seongnam-si (KR); Joon Woo Kim, Ansan-si (KR)

(73) Assignees: Hyundai Motor Company, Seoul (KR); Kia Motors Corporation, Seoul (KR); Molex, LLC, Lisle, IL (US); Yura Corporation, Seongnam-si (KR)

( * ) Notice: Subject to any disclaimer, the term of this patent is extended or adjusted under 35 U.S.C. 154(b) by 131 days.

(21) Appl. No.: 16/555,359

(22) Filed: Aug. 29, 2019

(65) Prior Publication Data
US 2020/0185740 A1 Jun. 11, 2020

(30) Foreign Application Priority Data
Dec. 11, 2018 (KR) .......................... 10-2018-0159131

(51) Int. Cl.
*H01M 8/04537* (2016.01)
*H01M 8/0438* (2016.01)
(Continued)

(52) U.S. Cl.
CPC ..... *H01M 8/04559* (2013.01); *H01M 8/0258* (2013.01); *H01M 8/0267* (2013.01);
(Continued)

(58) Field of Classification Search
CPC .......... H01M 8/04559; H01M 8/0258; H01M 8/0267; H01M 8/04089; H01M 8/04201;
(Continued)

(56) References Cited

U.S. PATENT DOCUMENTS

2016/0226092 A1* 8/2016 Nishiyama ............ H01M 8/241
2018/0351182 A1* 12/2018 Hood .................. H01M 8/0247

FOREIGN PATENT DOCUMENTS

JP          5011759 B2    8/2012
JP     2014175169 A  *  9/2014
(Continued)

*Primary Examiner* — Sean P Cullen
(74) *Attorney, Agent, or Firm* — Morgan, Lewis & Bockius LLP

(57) ABSTRACT

A fuel cell having a structure for detachably mounting a cell-monitoring connector thereon includes separators arranged to be spaced apart from each other in a first direction, each of the separators including a receiving recess arranged in one side thereof, and hook-shaped gaskets respectively disposed on the separators and located around the receiving recess. The cell-monitoring connector includes a housing, at least a portion of the housing being received in a receiving space defined by the receiving recess, and connection terminals inserted into the housing to be connected to the separators. The housing includes a body inserted into the receiving space in a second direction that intersects the first direction, and a lever portion including a
(Continued)

latching protrusion configured to be latched to or separated from a corresponding gasket among the hook-shaped gaskets by a pressing operation.

17 Claims, 12 Drawing Sheets

(51) Int. Cl.
| | |
|---|---|
| *H01M 8/0258* | (2016.01) |
| *H01M 8/0267* | (2016.01) |
| *H01M 8/04828* | (2016.01) |
| *H01M 8/04082* | (2016.01) |
| *H01M 8/04223* | (2016.01) |
| *H01M 8/04746* | (2016.01) |
| *H01M 8/04089* | (2016.01) |

(52) U.S. Cl.
CPC ..... *H01M 8/04089* (2013.01); *H01M 8/0494* (2013.01); *H01M 8/04201* (2013.01); *H01M 8/04223* (2013.01); *H01M 8/04388* (2013.01); *H01M 8/04753* (2013.01)

(58) Field of Classification Search
CPC ......... H01M 8/04223; H01M 8/04388; H01M 8/04753; H01M 8/0494
USPC .................................................. 429/432, 518
See application file for complete search history.

(56) References Cited

FOREIGN PATENT DOCUMENTS

| KR | 10-2014-0005194 A | 1/2014 |
|---|---|---|
| KR | 10-2014-0068208 A | 6/2014 |

* cited by examiner

CELL-MONITORING CONNECTOR AND FUEL CELL HAVING STRUCTURE FOR DETACHABLY MOUNTING THE CELL-MONITORING CONNECTOR THEREON

This application claims the benefit of priority to Korean Patent Application No. 10-2018-0159131, filed on Dec. 11, 2018 in the Korean Intellectual Property Office, which is hereby incorporated by reference as if fully set forth herein.

TECHNICAL FIELD

Exemplary embodiments of the present disclosure relate to a fuel cell having a structure for detachably mounting a cell-monitoring connector thereon.

BACKGROUND

A fuel cell stack is a device that supplies power, generated through the electrochemical reaction between air supplied to one surface of a polymer electrolyte membrane and hydrogen supplied to the opposite surface of the polymer electrolyte membrane, to an external load.

A fuel cell stack may have a structure in which hundreds of cells are stacked. When the unit cells operate normally during the operation of the fuel cell stack, the unit cells may form a predetermined magnitude of voltage. If any one of hundreds of cells fails to exhibit normal performance, the total output of the fuel cell stack is lowered. If the reverse voltage phenomenon continues, the operation of the fuel cell stack needs to be stopped. A cell-monitoring connector checks the state of the cells and continuously monitors the voltage of the cells. To this end, the cell-monitoring connector may be electrically connected to the cells in order to check the voltage of each unit cell of the fuel cell stack. Studies on various structures for electrical connection between a cell-monitoring connector and a fuel cell stack have been conducted.

SUMMARY

Accordingly, exemplary embodiments of the present disclosure are directed to a fuel cell having a structure for detachably mounting a cell-monitoring connector thereon that substantially obviates one or more problems due to limitations and disadvantages of the related art.

One of the objectives of the present disclosure is to provide a fuel cell having a structure for detachably mounting a cell-monitoring connector thereon in an easy, quick, and simple manner.

According to one exemplary embodiment of the present disclosure, a fuel cell having a structure for detachably mounting a cell-monitoring connector thereon may include a plurality of separators arranged to be spaced apart from each other in a first direction, each of the plurality of separators including a receiving recess arranged in one side of each of the plurality of separators, and a plurality of gaskets respectively disposed on the plurality of separators and located around the receiving recess. The cell-monitoring connector may include a housing, at least a portion of the housing being received in a receiving space defined by the receiving recess of each of the plurality of separators, and a plurality of connection terminals inserted into the housing, the plurality of connection terminals being connected to the plurality of separators, respectively. The housing may include a body inserted into the receiving space in a second direction that intersects the first direction, at least a portion of the body being received in the receiving space, and a lever portion including a latching protrusion configured to be movable when pressed in a third direction that intersects the first direction and the second direction, the latching protrusion being latched to or separated from a corresponding gasket among the plurality of gaskets.

In one exemplary embodiment, the lever portions may include a plurality of lever portions respectively connected to opposite sides of the body.

In one exemplary embodiment, the receiving recess may have a shape that is recessed inwards from an outer edge of each of the plurality of separators.

In one exemplary embodiment, the receiving recess may include a first side and a second side, facing each other in the third direction, and a third side arranged between the first side and the second side, the third side facing the cell-monitoring connector, and the plurality of separators, each including the receiving recess having the first side, the second side, and the third side, may be disposed to overlap each other in the first direction.

In one exemplary embodiment, the plurality of gaskets may include a first gasket and a second gasket, wherein the first and second gaskets are disposed to face each other in the third direction with respect to the receiving recess.

In one exemplary embodiment, each of the first and second gaskets may have a hook shape, and the hook shape of the first gasket and the hook shape of the second gasket may be symmetrical to each other in the third direction with respect to the receiving recess.

In one exemplary embodiment, each of the first gasket and the second gasket may include a first end facing the receiving recess in the third direction and a second end facing an outer edge of a respective separator in the second direction. The first end may be spaced apart from a respective one of the first side and the second side of the receiving recess, and the second end of each of the first gasket and the second gasket may be spaced apart from the outer edge.

In one exemplary embodiment, each of the plurality of gaskets may include a shift-preventing part disposed on the respective separator and located near the third side of the receiving recess. Each of the plurality of separators may include a first region in which the first gasket is disposed, the first region being contiguous with the first side of the receiving recess, a second region in which the second gasket is disposed, the second region being contiguous with the second side of the receiving recess, and a third region in which the shift-preventing part is disposed, the third region being contiguous with the third side of the receiving recess and surrounding the receiving recess together with the first region and the second region. The body of the housing may include a shift-preventing groove to allow the shift-preventing part to be inserted into the shift-preventing groove in the second direction.

In one exemplary embodiment, the shift-preventing part may include a third gasket disposed in the third region of each of the separators, the third gasket having a straight line shape in the second direction and having a protrusion shape that protrudes in the first direction.

In one exemplary embodiment, the third gasket may include a third end facing the third side of the receiving recess, and the third end of the third gasket may be spaced apart from the receiving recess.

In one exemplary embodiment, each of the lever portions may include a first end portion configured to receive pressure, the first end portion being spaced apart from an upper side of the body in the third direction, a second end portion connected to a lower side of the body, and a wing portion disposed between the first end portion and the second end portion, the wing portion having a bent shape. Each of the latching protrusions may be disposed on an outer side of the wing portion of a corresponding one of the lever portions, and the first end portion and the wing portion may be configured to be movable in the third direction when pressed, with the second end portion as a support axis.

In one exemplary embodiment, each of the latching protrusions may include a plurality of latching protrusions spaced apart from each other at a regular interval in the first direction, and each of the separators may be arranged into a respective one of first slits defined between the latching protrusions spaced apart from each other in the first direction.

In one exemplary embodiment, the lever portions may include an insulating material.

In one exemplary embodiment, the latching protrusions may have the same thickness as each other in the first direction, and the first slits may have the same width as each other in the first direction.

In one exemplary embodiment, the cell-monitoring connector may further include a terminal position assurance (TPA) detachably coupled to the housing, and the TPA may be configured such that the connection terminals are coupled into the housing in a press-fit manner.

BRIEF DESCRIPTION OF THE DRAWINGS

Arrangements and exemplary embodiments of the present disclosure are set forth in more detail in the accompanying drawings which are incorporated herein, and the following Detailed Description, which together serve to explain certain principles of the present disclosure.

DETAILED DESCRIPTION

Figure 1:
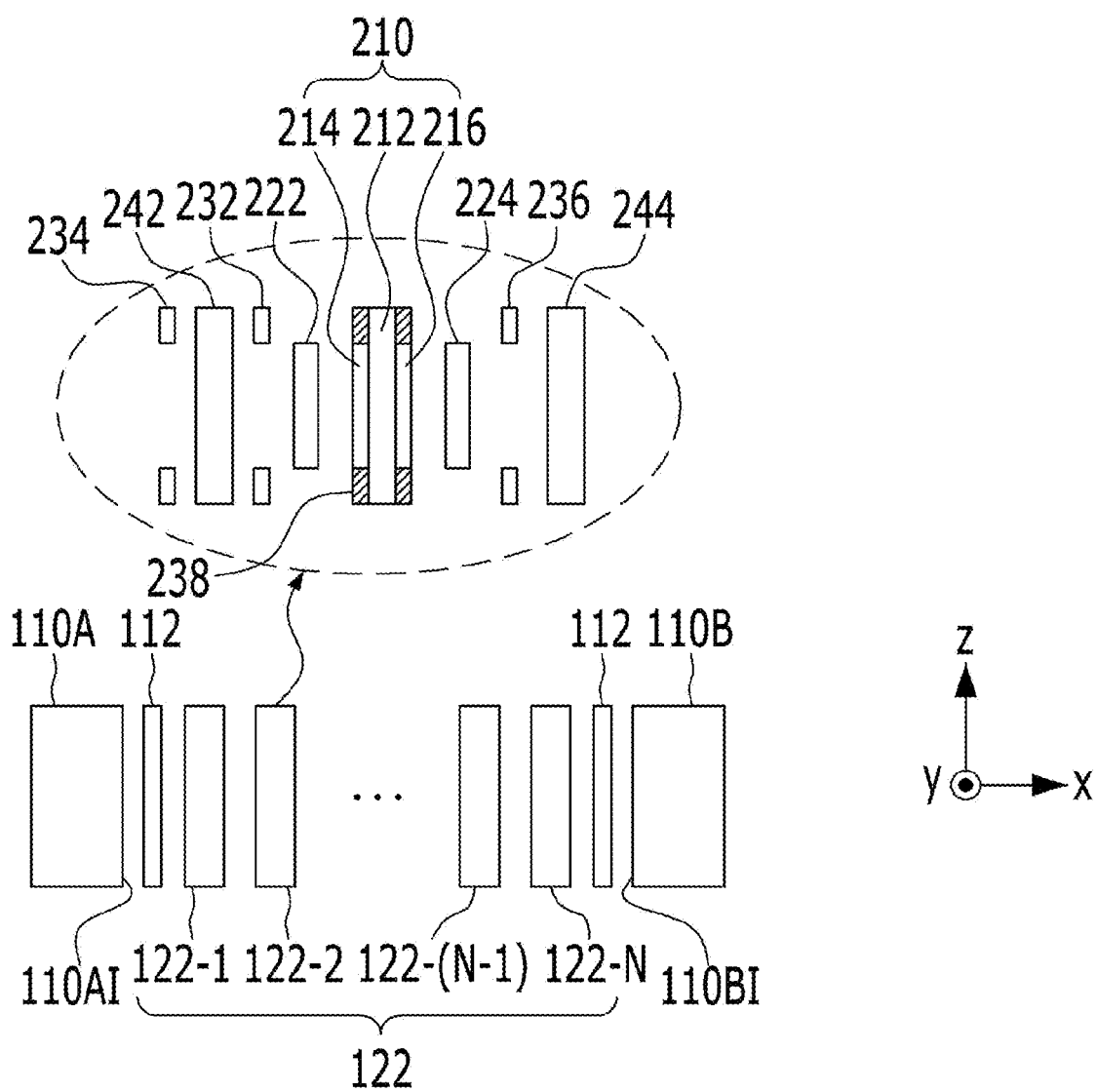
FIG. 1 is a cross-sectional view of end plates and a cell stack of a fuel cell.

The present disclosure will now be described more fully hereinafter with reference to the accompanying drawings, in which various exemplary embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell having a structure for detachably mounting a cell-monitoring connector thereon according to exemplary embodiments of the present disclosure will be described with reference to the accompanying drawings. The fuel cell having a structure for detachably mounting a cell-monitoring connector thereon will be described using the Cartesian coordinate system (x, y, z) for convenience of description. However, other different coordinate systems may be used. In the drawings, an x-axis, a y-axis, and a z-axis of the Cartesian coordinate system are perpendicular to each other. However, the embodiment is not limited thereto. That is, the x-axis, the y-axis, and the z-axis may intersect each other. In the following description, the x-axis direction may be referred to as a "first direction", the y-axis direction may be referred to as a "second direction", and the z-axis direction may be referred to as a "third direction". The first to third directions may be perpendicular to each other, or may intersect each other.

A fuel cell according to an exemplary embodiment of the present disclosure may be, for example, a polymer electrolyte membrane fuel cell (or a proton exchange membrane fuel cell) (PEMFC), which has been studied most extensively as a power source for driving vehicles. However, the embodiment is not limited to any specific form of the fuel cell.

The fuel cell may include end plates (pressing plates or compression plates) (not shown) and a cell stack (not shown).

Hereinafter, an example of the cell stack will be described with reference to FIG. 1. However, the embodiment is not limited to any specific structure of the cell stack.

FIG. 1 is a cross-sectional view of the end plates and the cell stack of the fuel cell.

The cell stack 122 may include a plurality of unit cells 122-1 to 122-N, which are stacked in the first direction. Here, "N" is a positive integer of 1 or greater, and may range from several tens to several hundreds. "N" may range, for example, from 100 to 300, and specifically may be 220. However, the embodiment is not limited to any specific value of "N".

Each unit cell 122-$n$ (where $1 \leq n \leq N$) may generate 0.6 volts to 1.0 volts of electricity, on average 0.7 volts of electricity. Thus, "N" may be determined in accordance with the intensity of the power to be supplied from the fuel cell to a load. Here, "load" may refer to a part of a vehicle that requires power when the fuel cell is used in a vehicle.

Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell may generate power due to the electrochemical reaction between hydrogen, which is fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water ("condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reaction gases, and to transfer the generated electric energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the embodiment is not limited to any specific configuration of the first and second gas diffusion layers 222 and 224.

The gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234 and 236, the flatness of the surfaces that are adjacent to the cell stack 122, which generates power, may be secured, and thus surface pressure may be distributed uniformly over the reaction surface of the cell stack 122. To this end, the gaskets 232, 234 and 236 may be formed of rubber. However, the embodiment is not limited to any specific material of the gaskets.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to the current collectors 112.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which a cooling medium (e.g. coolant) may flow. Further, the separators 242 and 244 may be formed of a graphite-based material, a composite graphite-based material, or a metal-based material. However, the embodiment is not limited to any specific material of the separators 242 and 244.

The end plates 110A and 110B shown in FIG. 1 may be disposed at the respective ends of the cell stack 122, and may support and fix the unit cells 122-1 to 122-N. That is, the first end plate 110A may be disposed at one end of the cell stack 122, and the second end plate 110B may be disposed at the opposite end of the cell stack 122.

Each of the first and second end plates 110A and 110B may be configured such that a metal insert is surrounded by a plastic injection-molded product. The metal insert of each of the first and second end plates 110A and 110B may have high rigidity to withstand internal surface pressure, and may be formed by machining a metal material. For example, each of the first and second end plates 110A and 110B may be formed by combining a plurality of plates. However, the embodiment is not limited to any specific configuration of the first and second end plates 110A and 110B.

The current collectors 112 may be disposed between the cell stack 122 and the inner surfaces 110AI and 110BI of the first and second end plates 110A and 110B that face the cell stack 122. The current collectors 112 serve to collect the electric energy generated by the flow of electrons in the cell stack 122 and to supply the electric energy to a load that uses the fuel cell.

Further, the first end plate 110A may include a plurality of manifolds (or communicating portions) M. Each of the first and second separators 242 and 244 shown in FIG. 1 may include manifolds that are formed in the same shape at the same positions as the manifolds of the first end plate 110A. Here, the manifolds may include an inlet manifold and an outlet manifold. Hydrogen and oxygen, which are reactant gases necessary in the membrane electrode assembly 210, may be introduced from the outside into the cell stack 122 through the inlet manifold. Gas or liquid, in which the reactant gases humidified and supplied to the cell and the condensate water generated in the cell are combined, may be discharged to the outside of the fuel cell through the outlet manifold. The cooling medium may flow from the outside into the cell stack 122 through the inlet manifold and may flow from the cell stack 122 to the outside through the outlet manifold. As described above, the manifolds allow the fluid to flow into and out of the membrane electrode assembly 210.

In order to determine the performance and failure of the cell stack 122, the separators 242 and 244 of each cell may be connected to a control circuit using a cell-monitoring connector and a wire in order to measure the voltage of each cell. Here, the control circuit may refer to a circuit including a measurement device and an electronic control unit for operating the fuel cell in a vehicle.

Hereinafter, a cell-monitoring connector for checking the state (e.g. the voltage) of each unit cell included in the fuel cell and the fuel cell having a structure for detachably mounting the connector thereon according to the embodiment will be described.

Figure 2:
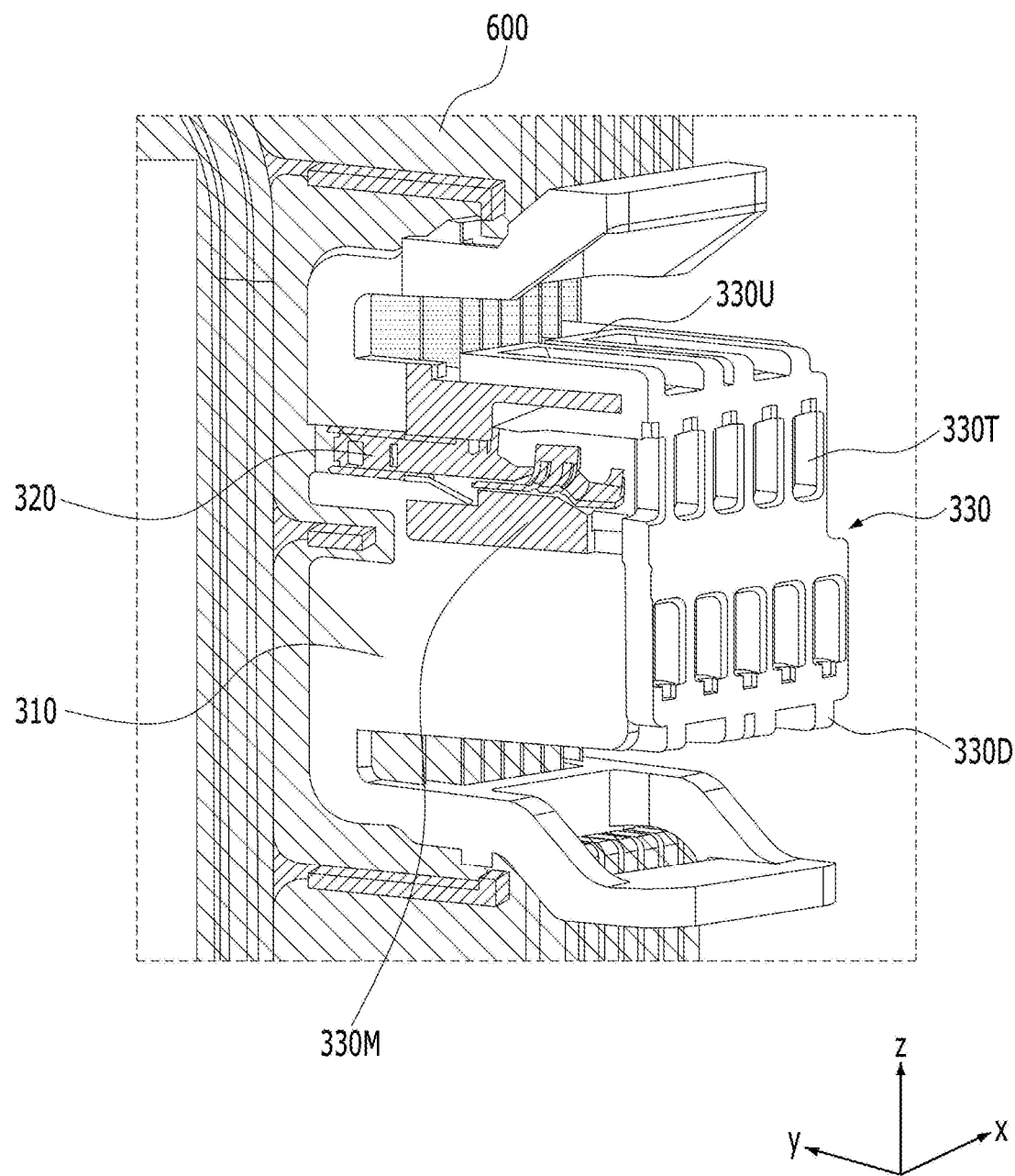
FIG. 2 is a perspective view showing the connection between a cell-monitoring connector and separators in the fuel cell according to an exemplary embodiment of the present disclosure.
Figure 3:
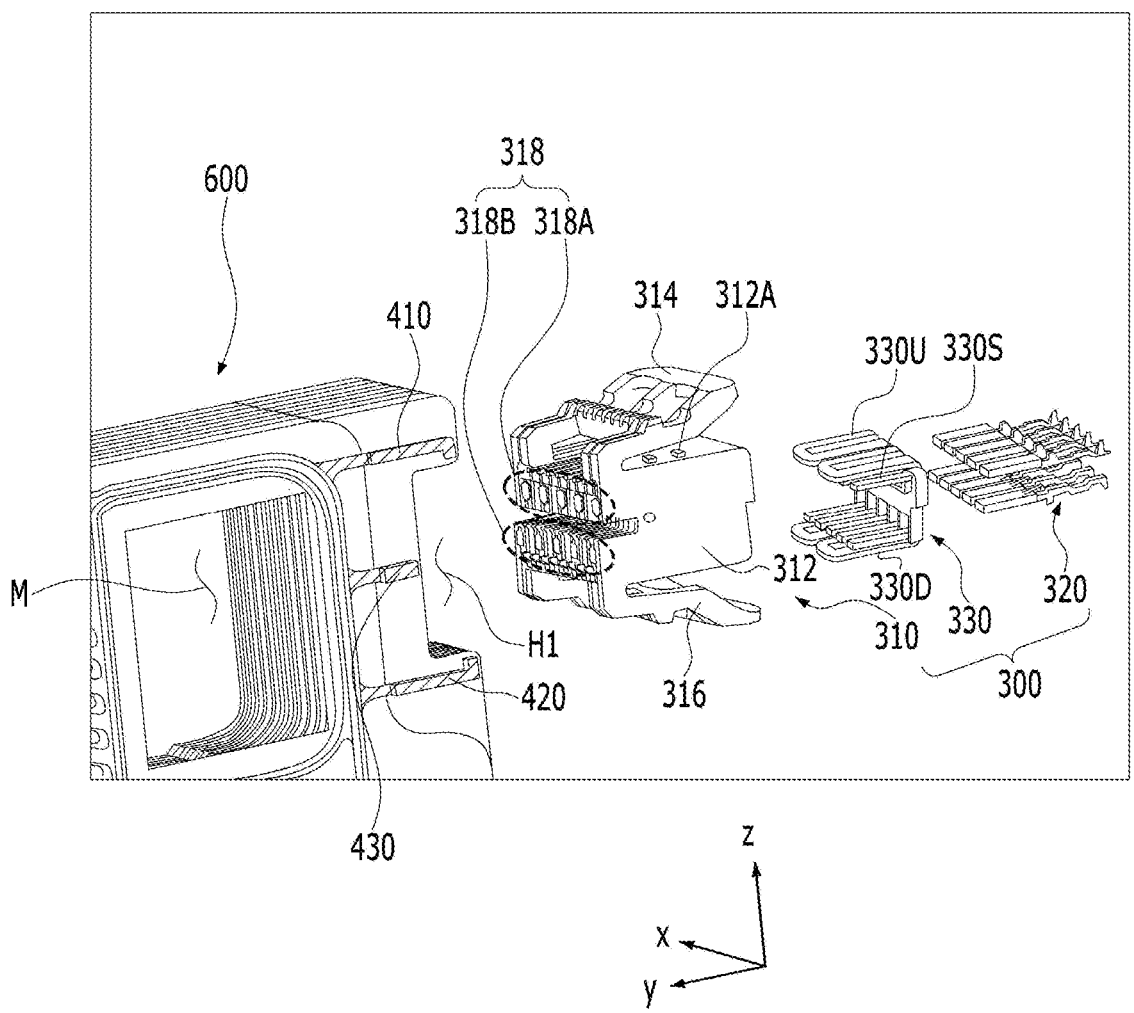
FIG. 3 is an exploded perspective view of the cell-monitoring connector and the separators shown in FIG. 2.
Figure 4:
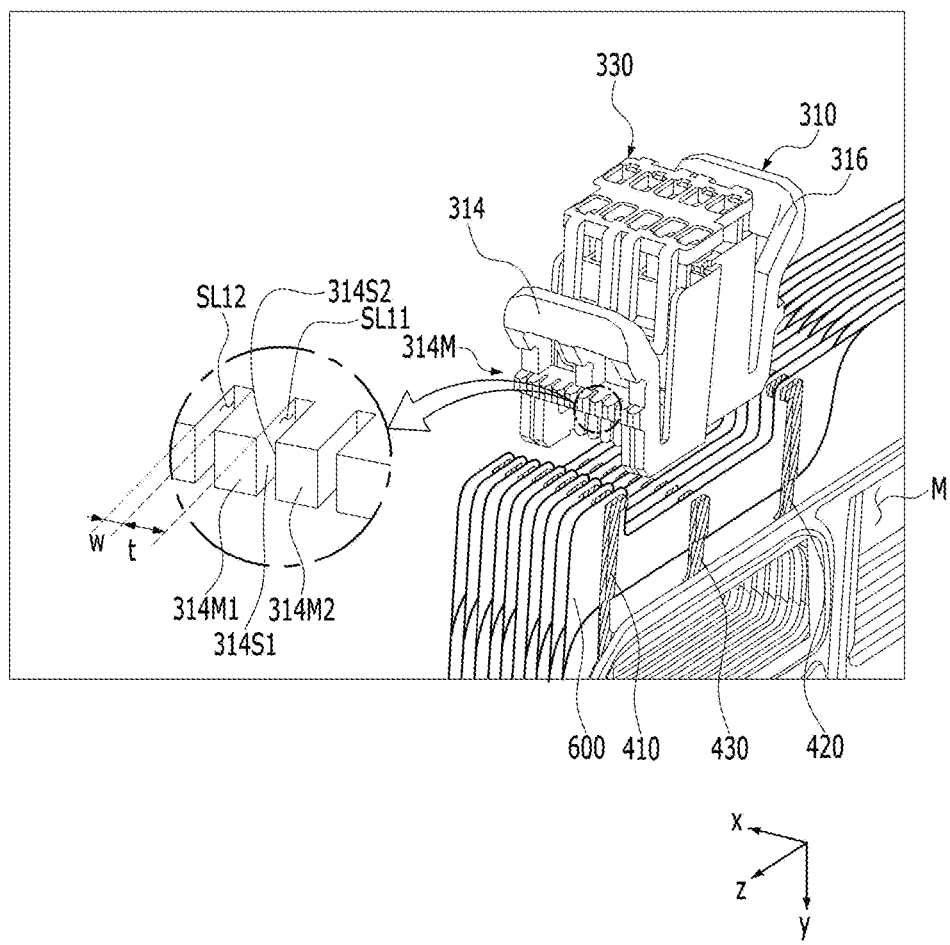
FIG. 4 is a partially exploded (or coupled) perspective view of the cell-monitoring connector and the separators shown in FIG. 3.
Figure 5:
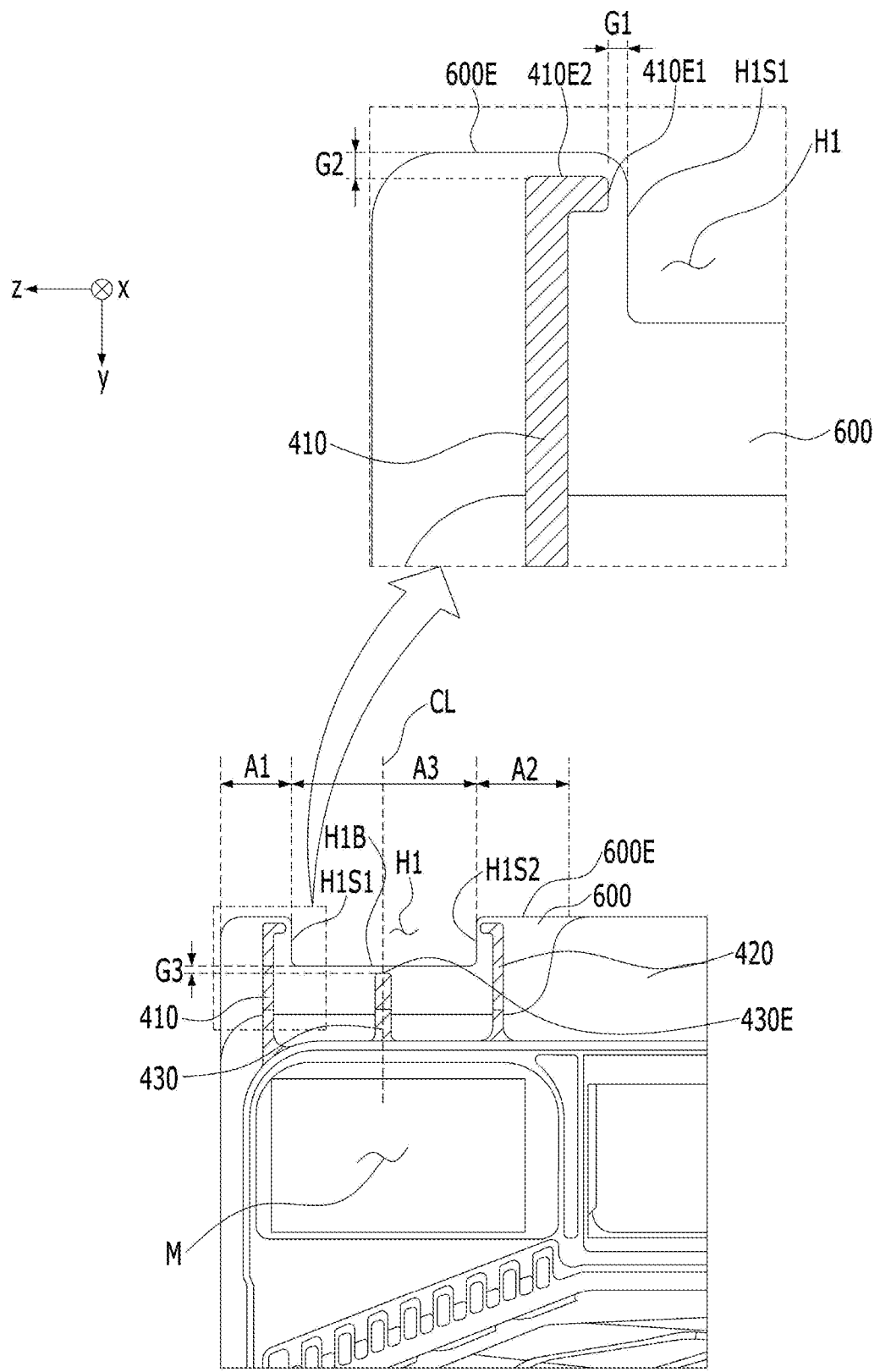
FIG. 5 is a view of the separators shown in FIGS. 2 to 4 when viewed in a first direction.

FIG. 2 is a perspective view showing the connection between a cell-monitoring connector 300 and separators 600 in a fuel cell according to an exemplary embodiment of the present disclosure, FIG. 3 is an exploded perspective view of the cell-monitoring connector 300 and the separators 600 shown in FIG. 2, FIG. 4 is a partially exploded (or coupled) perspective view of the cell-monitoring connector 300 and the separators 600 shown in FIG. 3, and FIG. 5 is a view of the separators 600 shown in FIGS. 2 to 4 when viewed in the first direction.

For convenience of description, FIGS. 2 to 5 show only the separators 600 and the gaskets 410 to 430, which are the parts to which the cell-monitoring connector 300 may be detachably mounted in the fuel cell according to an exemplary embodiment of the present disclosure. In the fuel cell according to the exemplary embodiment, components other than the separators 600 and the gaskets 410 to 430 may be embodied in various configurations, but are not limited to any specific configuration of the other components.

The separators 600 may correspond to the separators 242 and 244 shown in FIG. 1, and the gaskets 410 to 430 may correspond to the gaskets 232, 234 and 236 shown in FIG. 1. Alternatively, the gaskets 410 to 430 may be separate gaskets that diverge from the gaskets 232, 234 and 236 shown in FIG. 1.

The separators 600 may be disposed so as to be spaced apart from each other in the first direction. Each of the separators 600 includes a receiving recess H1 formed in the side thereof. The receiving recess H1 may have a shape that is recessed inwards from the outer edge 600E of each of the separators 600.

The receiving recess H1 may include a first side H1S1 and a second side H1S2, which face each other in the third direction, and a third side H1B, which is formed between the first side H1S1 and the second side H1S2 so as to face the cell-monitoring connector 300.

The separators 600 included in the cell stack 122 may correspond to some of all of the separators included in the fuel cell.

For example, all of the separators included in the fuel cell may be grouped into a plurality of unit groups, and each unit group, as illustrated, may include a plurality of separators 600. For example, the unit group shown in FIGS. 2 to 4 may include ten separators 600. In this case, the cell-monitoring connector may be detachably mounted on each of the unit groups of the fuel cell.

The separators 600, in each of which the receiving recess H1 including first, second and third sides H1S1, H1S2 and H1B is formed, may be disposed so as to overlap each other in the first direction. The receiving recesses H1 formed in the separators 600 define a receiving space into which the cell-monitoring connector 300 is fitted. That is, the receiving recesses H1 disposed in the first direction form a receiving space.

The gaskets may be disposed on the opposite surfaces (e.g. 600S1 and 600S2 shown in FIG. 7B, which will be described later) of each of the separators 600 so as to be located around the receiving recess H1, and may have a hook shape. Here, the hook shape is a shape to which latching protrusions 314M and 316M shown in FIG. 6 (which will be described later) may be latched. As shown in FIG. 5, the hook shape may be an "L" shape, but the embodiment is not limited thereto.

For example, the gaskets may include first and second gaskets 410 and 420. The first and second gaskets 410 and 420 may be disposed so as to face each other in the third direction with respect to the receiving recess H1.

The hook shapes of the first and second gaskets 410 and 420 may be symmetrical to each other with respect to the receiving recess H1. For example, referring to FIG. 5, the "L" shapes of the first and second gaskets 410 and 420 may be symmetrical to each other in the third direction with respect to the center line CL of the receiving recess H1.

A first end of each of the first and second gaskets 410 and 420, which faces the receiving recess H1, may be spaced apart from the receiving recess H1, and a second end of each of the first and second gaskets 410 and 420, which faces the outer edge 600E of each separator 600, may be spaced apart from the outer edge 600E. For example, the first end 410E1 of the first gasket 410, which faces the receiving recess H1, may be spaced apart from the first side H1S1 of the receiving recess H1 by a first gap G1, and the second end 410E2 of the first gasket 410, which faces the outer edge 600E of each separator 600, may be spaced apart from the outer edge 600E by a second gap G2.

If the first and second ends of each of the first and second gaskets 410 and 420 are disposed so as to be contiguous with the receiving recess H1 and the outer edge 600E without being spaced apart therefrom, the first and second gaskets 410 and 420 may invade the receiving recess H1, or may protrude outwards from the outer edge 600E. Further, the process of manufacturing the first and second gaskets 410 and 420 in consideration of avoidance of the above problem may be complicated. Therefore, according to an exemplary embodiment of the present disclosure, the first and second ends of each of the first and second gaskets 410 and 420 are respectively spaced apart from the receiving recess H1 and the outer edge 600E by the first and second gaps G1 and G2, thereby preventing the above problem.

Each of the opposite surfaces of each separator 600 may include first to third regions A1 to A3, which surround the receiving recess H1. The first region A1 is a region in which the first gasket 410 is formed, and is a region that is contiguous with the first side H1S1 of the receiving recess H1. The second region A2 is a region in which the second gasket 420 is formed, and is a region that is contiguous with the second side H1S2 of the receiving recess H1 while facing the first region A1 in the third direction. The third region A3 is a region that is contiguous with the third side H1B of the receiving recess H1 between the first region A1 and the second region A2.

The fuel cell according to an exemplary embodiment of the present disclosure may further include a shift-preventing part. The shift-preventing part may be disposed near the third side H1B of the receiving recess H1 in the third region A3 of the separator 600. The shift-preventing part may be implemented by the gasket. The third gasket 430 implementing the shift-preventing part may be disposed in the third region A3 of the separator 600 so as to have a thin and long straight line (-) shape extending in the second direction, and may be formed in the shape of a protrusion that protrudes in the first direction.

The third end 430E of the third gasket 430, which faces the third side H1B of the receiving recess H1, may be spaced apart from the third side H1B of the receiving recess H1 by a third gap G3.

The first to third gaps G1, G2 and G3 may be the same as or different from each other.

If the third end 430E of the third gasket 430 is disposed so as to be contiguous with the third side H1B of the receiving recess H1 without being spaced apart therefrom, the third gasket 430 may invade the receiving recess H1 beyond the third side H1B of the receiving recess H1. Further, the process of manufacturing the third gasket 430 in consideration of avoidance of the above problem may be complicated. Therefore, according to an exemplary embodiment of the present disclosure, the third end 430E of the third gasket 430 is spaced apart from the third side H1B of the receiving recess H1 by the third gap G3, thereby preventing the above problem.

The cell-monitoring connector 300 according to an exemplary embodiment of the present disclosure may have a structure that is capable of being detachably mounted on the fuel cell.

The cell-monitoring connector 300 may include a housing 310 and a connection terminal 320, and may further include a terminal position assurance (TPA) 330.

Figure 6A:
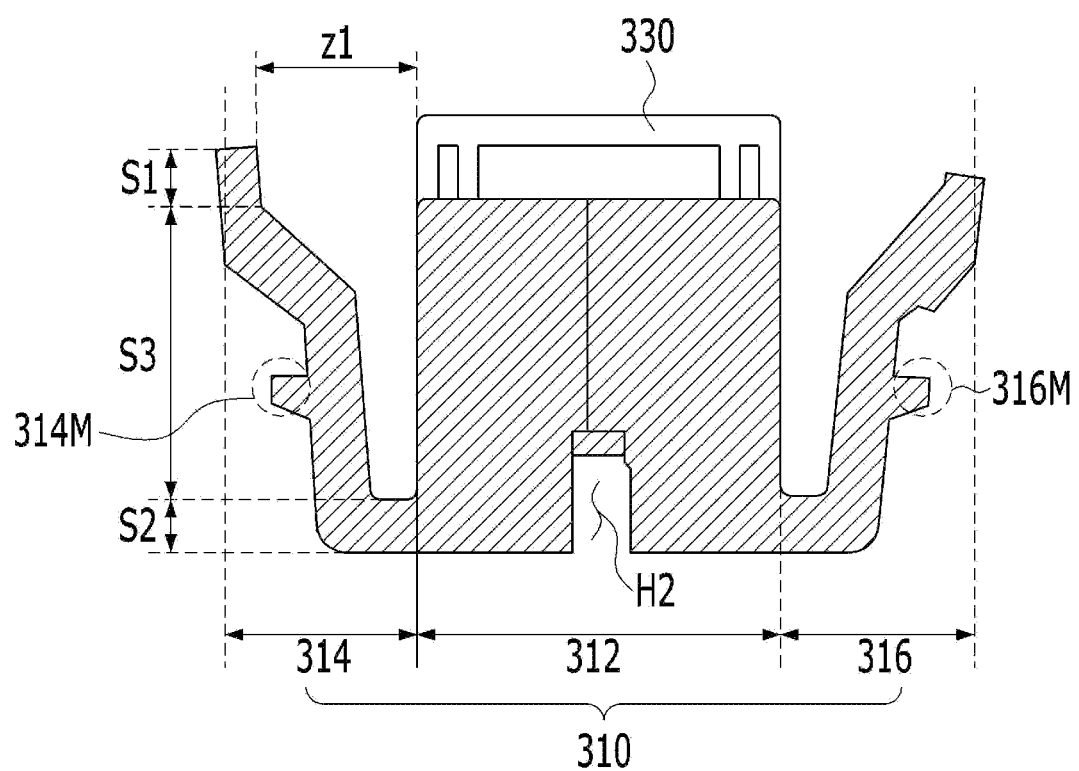
FIGS. 6A and 6B are views of the cell-monitoring connector according to an exemplary embodiment of the present disclosure when viewed in the first direction.
Figure 6B:
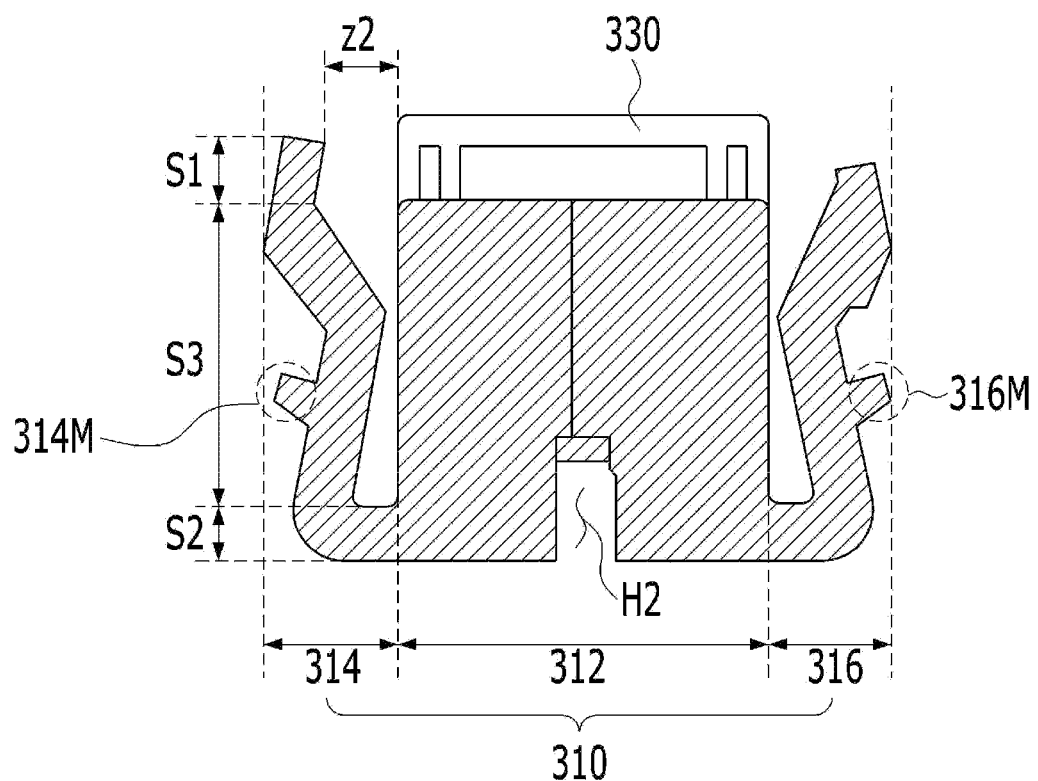

FIGS. 6A and 6B are views of the cell-monitoring connector 300 according to an exemplary embodiment of the present disclosure when viewed in the first direction.

At least a portion of the housing 310 may be received in the receiving space, which is defined by the receiving recesses H1 of the separators 600. The housing 310 may include a body 312 and a lever portion.

The body 312 may be inserted into the receiving space formed by arranging the receiving recess H1 in the second direction, and at least a portion of the body 312 may be received in the receiving space.

The lever portion may be connected to at least one of the opposite sides of the body 312, and when the body 312 moves to be inserted into the receiving space in the second direction, the lever portion may move toward the receiving space together with the body 312. For example, as illustrated, the lever portion may include a plurality of lever portions 314 and 316, which are respectively connected to the opposite sides of the body 312.

Hereinafter, a configuration in which the lever portion includes a plurality of lever portions 314 and 316 will be described by way of example. However, the following description may also be applied to a configuration in which the lever portion includes any one of the lever portions 314 and 316.

The lever portions 314 and 316 may respectively include latching protrusions 314M and 316M. The latching protrusions 314M and 316M may be moved in the third direction, which intersects the first and second directions, by being pressed by external force, and may be latched to or separated from the hook-shaped first and second gaskets 410 and 420.

Each of the lever portions 314 and 316 may include a first end portion S1, a second end portion S2, and a wing portion S3.

The first end portion S1 may be a portion to which pressure is directly applied, and may be a portion that is touched by a user. The first end portion S1 may be spaced apart from the upper side of the body 312 by a predetermined distance z1 or z2 in the third direction. When the lever portions 314 and 316 are not pressed, the first end portion S1 of each of the lever portions 314 and 316, as shown in FIG. 6A, may be spaced apart from the upper side of the body 312 by a first predetermined distance z1. When the lever portions 314 and 316 are pressed, the first end portion S1 of each of the lever portions 314 and 316, as shown in FIG. 6B, may be spaced apart from the upper side of the body 312 by a second predetermined distance z2, which is less than the first predetermined distance z1.

The second end portion S2 may be connected to the lower side of the body 312.

The wing portion S3 may be disposed between the first end portion S1 and the second end portion S2, and may have a bent shape. Each of the latching protrusions 314M and 316M may be disposed on the outer side of the wing portion S3 of a corresponding one of the lever portions 314 and 316.

When pressed, the first end portions S1 and the latching protrusions 314M and 316M of the wing portions S3 of the lever portions 314 and 316 may move in the third direction, with the second end portions S2 as a support axis. That is, when pressed, the first end portions S1 and the latching protrusions 314M and 316M of the wing portions S3 of the lever portions 314 and 316 may move in the third direction from the state shown in FIG. 6A to the state shown in FIG. 6B. On the other hand, when the applied pressure is removed, the first end portions S1 and the latching protrusions 314M and 316M of the wing portions S3 of the lever portions 314 and 316 may move in the third direction from the state shown in FIG. 6B to the state shown in FIG. 6A.

The latching protrusion of each of the first and second lever portions 314 and 316 may include a plurality of latching protrusions, which are spaced apart from each other at a regular interval in the first direction. For example, referring to FIG. 4, the latching protrusion of the first lever portion 314 may include a plurality of latching protrusions (e.g. 314M1 and 314M2), which are spaced apart from each other at a regular interval in the first direction.

Each of the separators 600 may be fitted into a respective one of first slits (e.g. SL11 and SL12) defined between the latching protrusions 314M1 and 314M2. For example, referring to FIG. 4, one of the separators 600 may be fitted into the first slit SL11 defined between the latching protrusions 314M1 and 314M2. If the first and second lever portions 314 and 316 are formed of an insulating material, two inner surfaces 314S1 and 314S2, which face each other, of the adjacent latching protrusions 314M1 and 314M2, which define the first slit SL11, may have an insulation property. To this end, the housing 310 including the latching protrusions 314M1 and 314M2 may be implemented in the form of a plastic injection-molded product having an insulation property.

In general, each of the adjacent separators 600 is conductive. Here, the latching protrusions 314M1 and 314M2 having an insulation property serve as insulators electrically isolating the separators 600, which are fitted into the respective first slits SL11 and SL12, from each other, thereby preventing the occurrence of a short between adjacent separators 600.

If the thicknesses t of the latching protrusions 314M1 and 314M2 in the first direction are the same and the widths w of the first slits SL11 and SL12 in the first direction are the same, the separators 600 may be regularly or equally spaced apart from each other in the first direction. Thus, the stacking tolerance of the separators 600 in the first direction may be eliminated. As such, when the separators 600 included in the cell stack 122 are in a good aligned state, the receiving recesses H1 defining the receiving space may be aligned without positional shifts. Thereby, the cell-monitoring connector 300 may be easily assembled to the separators 600. Further, when the cell-monitoring connector 300 is mounted to the separators 600, the inner edge of each separator 600, which is contiguous with the first, second and third sides H1S1, H1S2 and H1B of the receiving recess H1, may be prevented from being bent (deformed) or damaged.

Further, the body 312 of the housing 310 may include a shift-preventing groove H2 formed therein to allow the shift-preventing part (e.g. the third gasket 430) disposed on each separator 600 to be inserted thereinto in the second direction. As such, when the third gasket 430 is inserted into the shift-preventing groove H2, the cell-monitoring connector 300 coupled to the fuel cell may be prevented from being shifted in the third direction.

When the fuel cell is installed in a vehicle, if the cell-monitoring connector 300 shakes in the third direction due to vibration and impact caused by travel of the vehicle, it is not possible to accurately measure the voltage value. That is, the measured voltage value changes unstably, and thus the reliability of the measured value is lowered. The cell-monitoring connector 300 may, in the worst case, be separated from the separators 600. However, according to an exemplary embodiment of the present disclosure, the cell-monitoring connector 300 is prevented from being shifted in the third direction using the third gasket 430, which serves as the shift-preventing part, and the shift-preventing groove H2, thus preventing the above problem.

In addition, the housing 310 may include a plurality of second slits 318 formed in the rear surface thereof. The separators 600 located at the third sides H1B of the receiving recesses H1 defining the receiving space may be fitted into respective second slits 318. The second slits 318 may be divided into two sections 318A and 318B with respect to the shift-preventing groove H2. If the shift-preventing groove H2 is omitted, the second slits 318 may be divided into two sections 318A and 318B that face each other in the third direction. One of the two sections 318A and 318B includes slits into which the separators 600 located at the odd-numbered (or even-numbered) positions are fitted, and the other one of the two sections 318A and 318B includes slits into which the separators 600 located at the even-numbered (or odd-numbered) positions are fitted. As such, when adjacent separators 600 are alternately fitted into the second slits of the two different sections 318A and 318B, the interval between adjacent separators 600 in the first direction may be reduced.

Figure 7A:
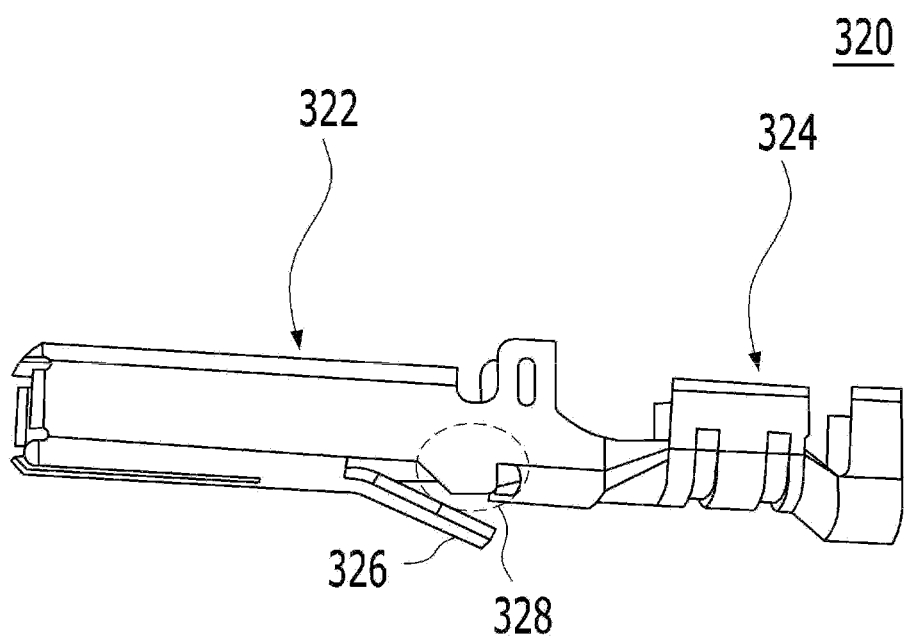
FIGS. 7A and 7B are a perspective view and a plan view, respectively, of a connection terminal according to an exemplary embodiment of the present disclosure.
Figure 7B:
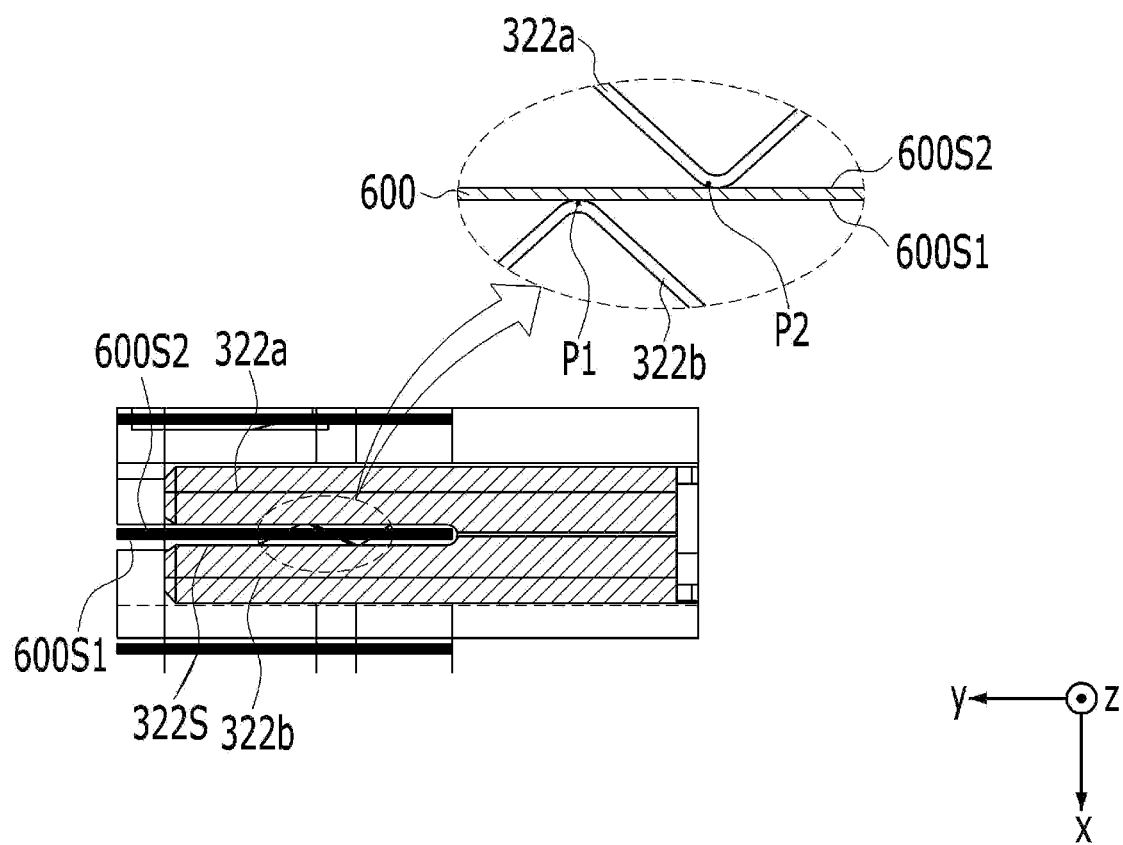

FIGS. 7A and 7B are a perspective view and a plan view, respectively, of the connection terminal 320 according to an exemplary embodiment of the present disclosure.

A plurality of connection terminals 320 may be inserted into connection terminal insertion holes in the housing 310, and may be connected to respective ones of the separators 600. To this end, the housing 310 may include connection terminal insertion holes formed in the front surface thereof to communicate with the second slits 318.

Each of the connection terminals 320 may include a terminal connection portion 322 and a wire-holding portion 324. The terminal connection portion 322 is inserted into a corresponding connection terminal insertion hole to be connected to a corresponding separator 600. The wire-holding portion 324 extends from the terminal connection portion 322 to hold a wire (an electric wire), that is, to be wrapped by the wire.

The terminal connection portion 322 may include connection pieces 322a and 322b, which resiliently spread and contact the opposite surfaces 600S1 and 600S2 of the separator 600. The connection points P1 and P2 of the connection pieces 322a and 322b may be disposed so as to cross from each other. As such, according to the embodiment, since the connection points P1 and P2 of the connection pieces 322a and 322b cross from each other, when the separator 600 is inserted into a third slit 322S defined by the two connection pieces 322a and 322b, the contact force between the separator 600 and the connection pieces 322a and 322b may increase, and the separator 600 may be supported more resiliently. Thus, even when the separator 600 is implemented as an ultra-thin film having a thickness of 0.1 mm or less, the connection terminal 320 may be prevented from being unintentionally separated from the separator 600. That is, the force of holding the connection terminal 320 to the separator 600 may increase, which results in improved reliability of the product.

The terminal connection portion 322 of the connection terminal 320 may have a rectangular parallelepiped shape including an opening in the front side thereof, but the embodiment is not limited thereto.

In addition, the connection terminal 320 may further include a first locking protrusion 326. The first locking protrusion 326 may be disposed on the bottom surface of the terminal connection portion 322 so as to be oriented toward the wire-holding portion 324. The first locking protrusion 326 may have a shape that is bent and extends downwards from the bottom surface of the terminal connection portion 322.

In addition, the connection terminal 320 may further include a connection guide portion 328. The connection guide portion 328 may prevent the connection terminal 320, connected to the separator 600 through the housing 310, from being separated from the separator 600.

The terminal position assurance (TPA) 330 may be detachably fitted into a TPA terminal insertion hole formed in the front surface of the housing 310, and may press-fit the connection terminal 320 into the housing 310. That is, the TPA 330 may increase the insertion force of the connection terminal 320, may prevent erroneous assembly by correctly positioning the connection terminal 320, and may make it possible to continuously sense the voltage value with high electrical reliability in spite of the small pitches between the separators 600. To this end, the housing 310 may include a TPA terminal insertion hole formed in a portion thereof above the connection terminal insertion hole.

Referring to FIG. 3, the TPA 330 may include a top-surface-fixing piece 330U and a bottom-surface-fixing piece 330D. In addition, the housing 310 may include a second locking protrusion 312A and a third locking protrusion (not shown). The second locking protrusion 312A may be formed on one side surface of the body 312, to which the first lever portion 314 is connected, and the third locking protrusion may be formed on the opposite side surface of the body 312, to which the second lever portion 316 is connected.

The top-surface-fixing piece 330U of the TPA 330 may be coupled to the second locking protrusion 312A, and the bottom-surface-fixing piece 330D of the TPA 330 may be coupled to the third locking protrusion.

The TPA 330 may further include a through-hole 330T formed therein, which corresponds to the connection terminal insertion hole, and a TPA terminal 330S, which is inserted into the connection terminal insertion hole.

When the TPA 330 is assembled to the housing 310, the TPA 330 is aligned with the front surface of the housing 310 and is moved forwards in the second direction, with the result that the top-surface-fixing piece 330U of the TPA 330 is locked to the second locking protrusion 312A, and the bottom-surface-fixing piece 330D of the TPA 330 is locked to the third locking protrusion. Further, the connection terminal 320 is inserted into the through-hole 330T in the TPA 330 and the connection terminal insertion hole in the housing 310. At this time, the first locking protrusion 326 shown in FIG. 7A is caught in the housing 310 and is blocked by a locking member 330M of the TPA 330 shown in FIG. 2. Thus, the connection terminal 320 is prevented from being separated from the housing 310 even when external vibration or impact is applied thereto, and consequently the connection with the separators 600 is maintained.

Hereinafter, a process of mounting and demounting the cell-monitoring connector 300 to and from the fuel cell having the above-described construction will be described.

Figure 8A:
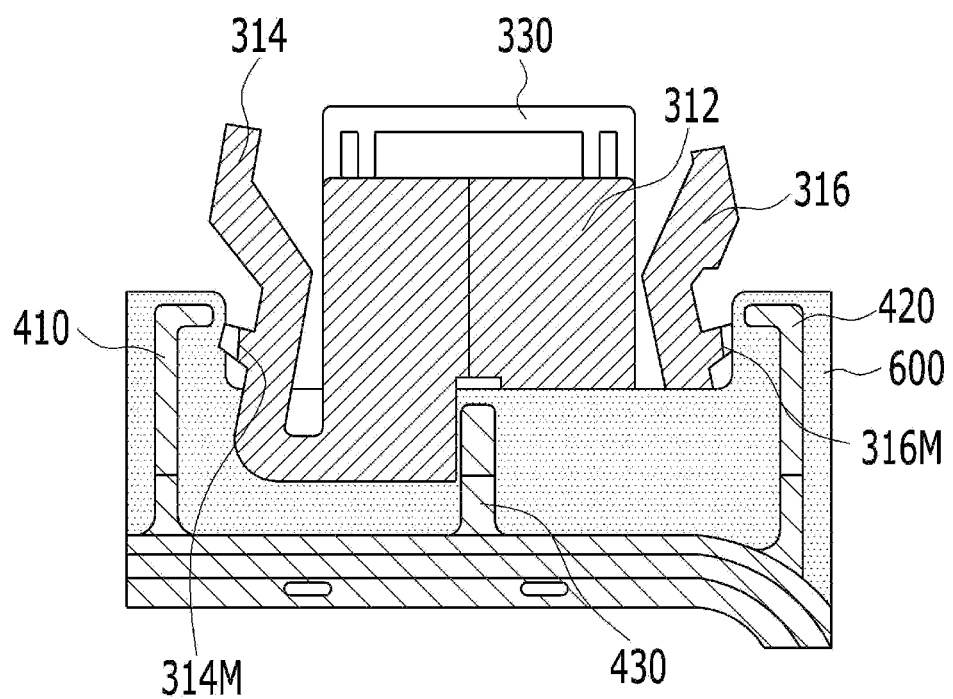
FIGS. 8A and 8B show a state in which a housing is inserted into a receiving space.
Figure 8A:
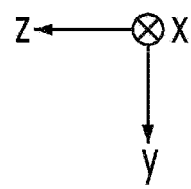
Figure 8B:
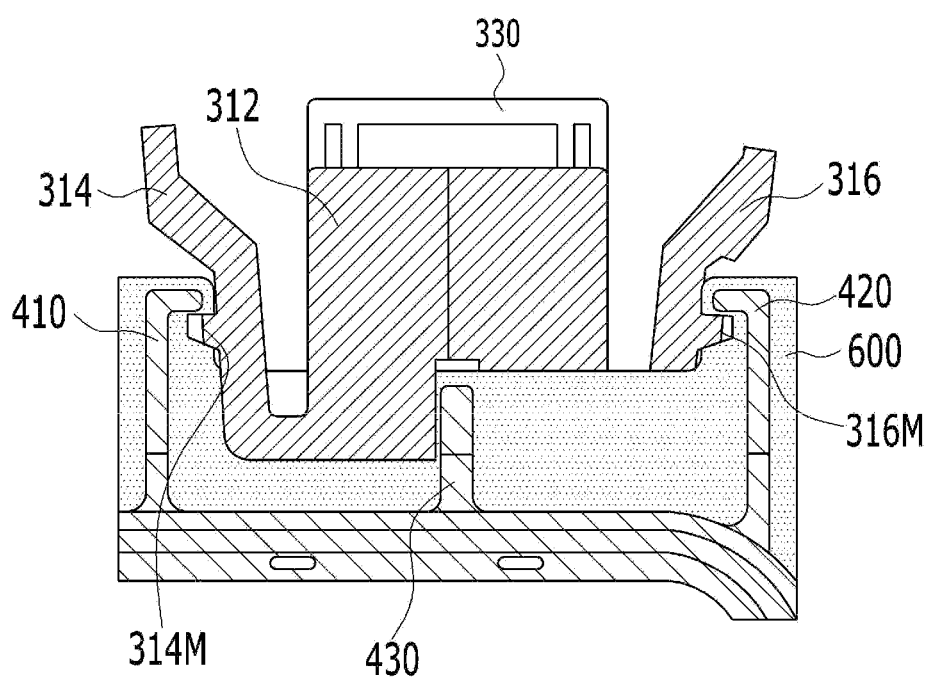
Figure 8B:
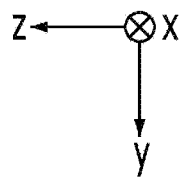

FIGS. 8A and 8B show a state in which the housing 310 is inserted into the receiving space defined by the receiving recesses H1.

When pressed, as shown in FIG. 6B, the lever portions 314 and 316 may move close to the body 312 in the third direction, and as shown in FIG. 8A, at least a portion thereof may be received in the receiving space together with the body 312. Thereafter, when the applied pressure is removed, as shown in FIG. 6A, the lever portions 314 and 316 may move away from the body 312 in the third direction, and as shown in FIG. 8B, the latching protrusions 314M and 316M may be latched to the hook-shaped gaskets 410 and 420. When the latching protrusions 314M and 316M are latched to the hook-shaped gaskets 410 and 420, the cell-monitoring connector 300 may monitor the state of each of the cells included in the unit group of the fuel cell. Here, the state that is monitored may refer to the performance and failure of each cell, e.g. the voltage of the corresponding cell.

When pressed again in the state in which the latching protrusions 314M and 316M are latched to the hook-shaped gaskets 410 and 420 as shown in FIG. 8B, the latching protrusions 314M and 316M of the lever portions 314 and 316 may be separated from the hook-shaped gaskets 410 and 420, as shown in FIG. 8A. Thereafter, the housing 310 may be moved in the second direction, and may escape from the receiving space. When the latching protrusions 314M and 316M are separated from the hook-shaped gaskets 410 and 420, the cell-monitoring connector 300 and the fuel cell may be electrically disconnected from each other, and the monitoring of the state of each of the cells included in the unit group may be terminated.

Hereinafter, a fuel cell according to a comparative example and a fuel cell according to an exemplary embodiment of the present disclosure will be described.

Figure 9:
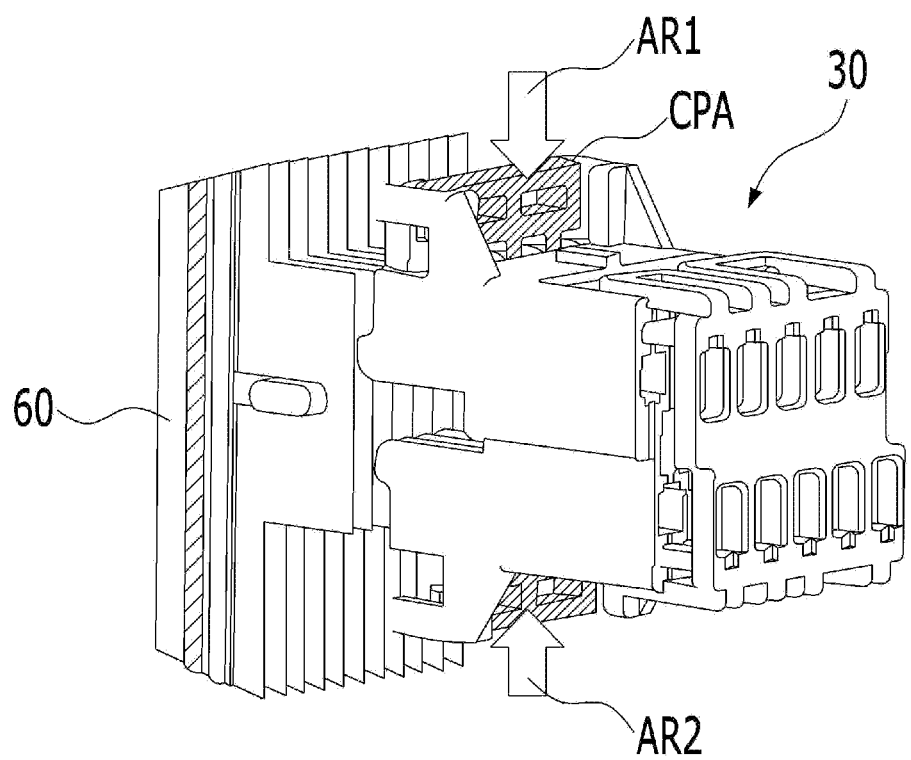
FIG. 9 is a perspective view of a fuel cell equipped with a cell-monitoring connector according to a comparative example.

FIG. 9 is a perspective view of a fuel cell equipped with a cell-monitoring connector 30 according to a comparative example.

It is assumed that the cell-monitoring connector 30 and the separators 60 shown in FIG. 9 perform the same function as the cell-monitoring connector 300 and the separators 600 according to an exemplary embodiment of the present disclosure, respectively.

In the comparative example, as shown in FIG. 9, after the cell-monitoring connector 30 is coupled to the separators 60, locking devices, which are formed of plastic and are referred to as a "connector position assurance (CPA)", are press-fitted into the upper end and the lower end of the cell-monitoring connector 30 in the directions indicated by the arrows AR1 and AR2, whereby the cell-monitoring connector 30 is completely mounted to the separators 60.

Since the cell-monitoring connector 30 is secured to the separators 60 using the CPAs, it is possible to prevent the cell-monitoring connector 30 from being separated from the separators 60 due to external vibration and impact. However, due to the process of fitting and removing two CPAs into and from the upper and lower ends of the cell-monitoring connector 30, it takes a long time to mount and demount the cell-monitoring connector 30 to and from the separators 60 in terms of production and in terms of repair and maintenance. Further, because two CPAs are required, the production cost increases.

On the other hand, according to an exemplary embodiment of the present disclosure, since the latching protrusions 314M and 316M of the cell-monitoring connector 300 are fitted to be capable of being latched to or separated from the hook-shaped first and second gaskets 410 and 420 through the pressing operation, it is possible to mount and demount the cell-monitoring connector 300 to and from the separators 600 without CPAs used in the comparative example. As such, since CPAs are not required, it is possible to shorten a time required to mount and demount the cell-monitoring connector 300 to and from the separators 600 in terms of production and in terms of repair and maintenance, compared to the comparative example, thereby improving assembly efficiency. Further, since CPAs are not required, the production cost is reduced.

As is apparent from the above description, according to a fuel cell having a structure for detachably mounting a cell-monitoring connector thereon according to an exemplary embodiment of the present disclosure, latching protrusions serve as insulators electrically isolating separators, which are fitted into respective first slits, from each other, thereby preventing the occurrence of a short between adjacent separators.

In addition, if the thicknesses of the latching protrusions in the first direction are the same and the widths of the first slits in the first direction are the same, the separators may be regularly or equally spaced apart from each other in the first direction. Thus, the stacking tolerance of the separators in the first direction may be eliminated. As such, the separators may be in a good aligned state so that receiving recesses defining a receiving space may be aligned without positional shifts. Thereby, the cell-monitoring connector may be easily assembled to the separators. Further, when the cell-monitoring connector is mounted to the separators, the inner edge of each separator, which is contiguous with the first, second and third sides of the receiving recess, may be prevented from being bent (deformed) or damaged.

In addition, when the fuel cell according to the embodiment is installed in a vehicle, if the cell-monitoring connector shakes in the third direction due to vibration and impact caused by travel of the vehicle, it is not possible to accurately measure the voltage value. That is, the measured voltage value changes unstably, and thus the reliability of the measured value is lowered. The cell-monitoring connector may, in the worst case, be separated from the separators. However, according to the embodiment, the cell-monitoring connector is prevented from being shifted in the third direction using a third gasket, which serves as a shift-preventing part, and a shift-preventing groove, thus preventing the above problem.

In addition, according to an exemplary embodiment of the present disclosure, since adjacent separators are alternately fitted into second slits of two different sections, the interval between adjacent separators in the first direction may be reduced.

In addition, according to an exemplary embodiment of the present disclosure, since the connection points of connection pieces, which are connected to each separator, cross from each other, when the separator is inserted into a third slit defined by the two connection pieces, the contact force between the separator and the connection pieces may increase, and the separator may be supported more resiliently. Thus, even when the separator is implemented as an ultra-thin film, a connection terminal may be prevented from being unintentionally separated from the separator. That is, the force of holding the connection terminal to the separator may increase, which results in improved reliability of the product.

In addition, according to an exemplary embodiment of the present disclosure, since the latching protrusions of the cell-monitoring connector are fitted to be latched to or separated from hook-shaped first and second gaskets through the pressing operation, it is possible to mount and demount the cell-monitoring connector to and from the separators without separate equipment such as a connector position assurance (CPA). Thus, it is possible to shorten a time required to mount and demount the cell-monitoring connector to and from the separators in terms of production and in terms of repair and maintenance, thereby improving assembly efficiency and reducing production cost.

The above-described various exemplary embodiments may be combined with each other without departing from the object of the present disclosure unless being contrary to each other. In addition, for any element, which is not described in detail, of any of the various exemplary embodiments, refer to the description of the element having the same reference numeral of another exemplary embodiment.

While the present disclosure has been particularly shown and described with reference to exemplary embodiments thereof, these exemplary embodiments are only proposed for illustrative purposes and do not restrict the present disclosure, and it will be apparent to those skilled in the art that various changes in form and detail may be made without departing from the essential characteristics of the exemplary embodiments set forth herein. For example, respective configurations set forth in the exemplary embodiments may be modified and applied. Further, differences in such modifications and applications should be construed as falling within the scope of the present disclosure as defined by the appended claims.

What is claimed is:

1. A cell-monitoring connector and a fuel cell having a structure for detachably mounting the cell-monitoring connector thereon, the fuel cell comprising:
   a plurality of separators arranged to be spaced apart from each other in a first direction, each of the plurality of separators including a receiving recess arranged in one side thereof; and
   a plurality of gaskets respectively disposed on the plurality of separators, wherein the gasket disposed on a corresponding one of the plurality of separators is spaced apart from and located around the receiving recess arranged in the corresponding one of the plurality of separators, wherein the cell-monitoring connector comprises:
   a housing, at least a portion of the housing being received in a receiving space defined by the receiving recess of each of the plurality of separators; and
   a plurality of connection terminals inserted into the housing, the plurality of connection terminals being connected to the plurality of separators, respectively, and
   wherein the housing comprises:
   a body inserted into the receiving space in a second direction that intersects the first direction, at least a portion of the body being received in the receiving space; and
   a lever portion comprising a latching protrusion configured to be movable when pressed in a third direction that intersects the first direction and the second direction, the latching protrusion being latched to or separated from a corresponding gasket among the plurality of gaskets.

2. The cell-monitoring connector and the fuel cell according to claim 1, wherein the lever portion comprises a plurality of lever portions respectively connected to opposite sides of the body.

3. The cell-monitoring connector and the fuel cell according to claim 1, wherein the receiving recess has a shape that is recessed inwards from an outer edge of each of the plurality of separators.

4. The cell-monitoring connector and the fuel cell according to claim 1, wherein the cell-monitoring connector further comprises a terminal position assurance (TPA) detachably coupled to the housing, the TPA being configured such that the plurality of connection terminals are coupled into the housing in a press-fit manner.

5. The cell-monitoring connector and the fuel cell according to claim 1, wherein the lever portion comprises:
   a first end portion configured to receive pressure, the first end portion being spaced apart from an upper side of the body in the third direction;
   a second end portion connected to a lower side of the body; and
   a wing portion disposed between the first end portion and the second end portion, the wing portion having a bent shape,
   wherein the latching protrusion is disposed on an outer side of the wing portion of the lever portion, and
   wherein the first end portion and the latching protrusion are configured to be movable in the third direction when pressed, with the second end portion as a support axis.

6. The cell-monitoring connector and the fuel cell according to claim 5, wherein the latching protrusion comprises a plurality of latching protrusions spaced apart from each other at a regular interval in the first direction, and
   wherein each of the plurality of separators is arranged into a respective one of first slits defined between the plurality of latching protrusions spaced apart from each other in the first direction.

7. The cell-monitoring connector and the fuel cell according to claim 6, wherein the lever portions include an insulating material.

8. The cell-monitoring connector and the fuel cell according to claim 6, wherein the latching protrusions have a same thickness as each other in the first direction, and
   wherein the first slits have a same width as each other in the first direction.

9. The cell-monitoring connector and the fuel cell according to claim 1, wherein the receiving recess comprises:

a first side and a second side, facing each other in the third direction; and a third side arranged between the first side and the second side, the third side facing the cell-monitoring connector, and wherein the plurality of separators, each including the receiving recess having the first side, the second side, and the third side, are disposed to overlap each other in the first direction.

10. The cell-monitoring connector and the fuel cell according to claim 9, wherein the plurality of gaskets comprise a first gasket and a second gasket, and wherein the first and second gaskets are disposed to face each other in the third direction with respect to the receiving recess.

11. The cell-monitoring connector and the fuel cell according to claim 10, wherein each of the first and second gaskets has a hook shape, and the hook shape of the first gasket and the hook shape of the second gasket are symmetrical to each other in the third direction with respect to the receiving recess.

12. The cell-monitoring connector and the fuel cell according to claim 10, wherein each of the first and second gaskets comprises a first end facing the receiving recess in the third direction and a second end facing an outer edge of each of the plurality of separators in the second direction, wherein the first end is spaced apart from a respective one of the first and second sides of the receiving recess, and wherein the second end is spaced apart from the outer edge.

13. The cell-monitoring connector and the fuel cell according to claim 10, wherein the fuel cell further comprises a shift-preventing part disposed on each of the plurality of separators and located in a vicinity of the third side of the receiving recess.

14. The cell-monitoring connector and the fuel cell according to claim 13, wherein each of the plurality of separators comprises:

a first region in which the first gasket is disposed;

a second region in which the second gasket is disposed; and a third region in which the shift-preventing part is disposed, wherein the first region is contiguous with the first side of the receiving recess, wherein the second region is contiguous with the second side of the receiving recess, and wherein the third region is contiguous with the third side of the receiving recess and surrounds the receiving recess together with the first region and the second region of each of the plurality of separators.

15. The cell-monitoring connector and the fuel cell according to claim 14, wherein the body of the housing comprises a shift-preventing groove to allow the shift-preventing part to be inserted into the shift-preventing groove in the second direction.

16. The cell-monitoring connector and the fuel cell according to claim 15, wherein the plurality of gaskets comprise a third gasket including the shift-preventing part disposed in the third region of each of the plurality of separators, the third gasket having a straight line shape in the second direction and having a protrusion shape that protrudes in the first direction.

17. The cell-monitoring connector and the fuel cell according to claim 16, wherein the third gasket comprises a third end facing the third side of the receiving recess, and wherein the third end of the third gasket is spaced apart from the receiving recess.

\* \* \* \* \*